Patented Nov. 18, 1924.

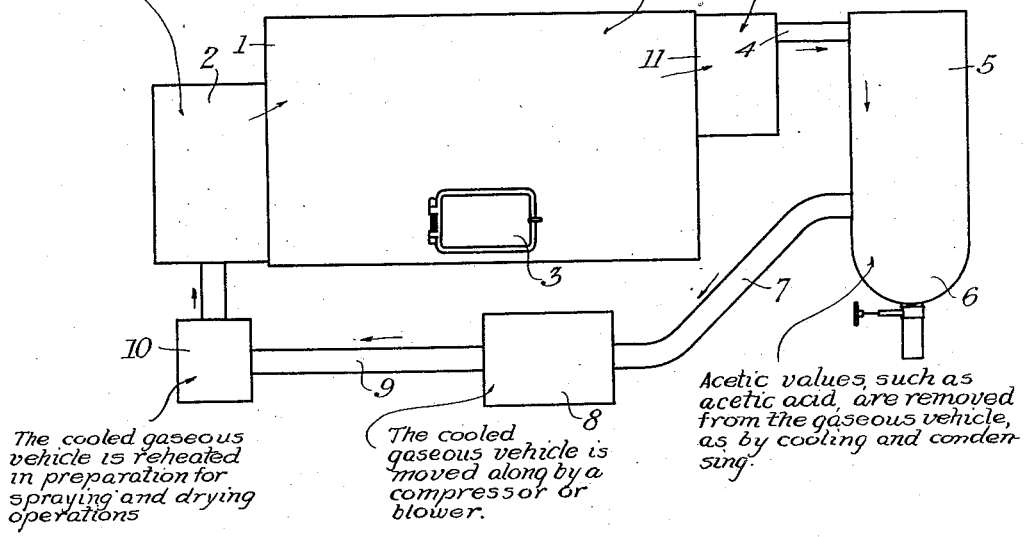

1,516,225

UNITED STATES PATENT OFFICE.

WILLIAM R. WEBB, OF ROCHESTER, NEW YORK, ASSIGNOR TO EASTMAN KODAK COMPANY, OF ROCHESTER, NEW YORK, A CORPORATION OF NEW YORK.

PROCESS OF MANUFACTURING CELLULOSE ACETATE.

Application filed November 15, 1923. Serial No. 675,004.

*To all whom it may concern:*

Be it known that I, WILLIAM R. WEBB, a citizen of the United States of America, residing at Rochester, in the county of Monroe and State of New York, have invented certain new and useful Improvements in Processes of Manufacturing Cellulose Acetate, of which the following is a full, clear, and exact specification.

This invention relates to the manufacture of cellulose acetate. One object of the invention is to substantially lessen the cost of such manufacture. Another object is to provide a process in which acetic values, such as acetic acid or acetic anhydride, or both, can be quickly and inexpensively removed from the reaction mixture and recovered in concentrated form. Still another object of the invention is to provide a process in which the surface of the reaction mixture is greatly increased by spraying, in order to facilitate the rapid taking up of vapors of acetic values by means of a gaseous vehicle, such as air. A further object of the invention is to obtain the cellulose acetate from which the bulk of acetic values have been removed, in a powder form that is convenient to manipulate and has a large aggregate surface, relative to its mass, which facilitates and renders uniform a further treatment by liquids, such as washes, reaction baths, and solvents. Other objects will hereinafter appear.

In the drawing the single figure is a diagrammatic side elevation showing one form of apparatus in which my process may be conveniently carried out, the relative sizes of the parts being exaggerated for the sake of clearness.

Cellulose acetate is produced by the action of acetylating agents on cellulose in the presence of catalysts. The reaction mixture may, for example, comprise cellulose, acetic anhydride, acetic acid and sulfuric acid and as the reaction progresses the mass contains various reaction products including cellulose acetate. An example of this general type of reaction mixture is given in detail in U. S. Reissue Patent No. 12,637, Miles, Apr. 23, 1907. Of course, in place of sulfuric acid any other liquid or solid condensing agent known in the art may be substituted. The acetylating reaction at first forms a chloroform-soluble cellulose acetate. Then a hydrolyzing mixture, which includes a relatively small amount of water, is introduced and reaction carried on until the cellulose acetate reaches the acetone-soluble stage. Before the hydrolyzing mixture acts, the excess or unused acetic anhydride is converted into acetic acid by reacting with the proper amount of water. Sufficient water can be introduced in the hydrolyzing mixture to "kill" the acetic anhydride and cooperate in the conversion of the cellulose acetate. At the end of the chloroform-soluble stage there remain considerable amounts of acetic values in the mixture, such as acetic anhydride and acetic acid (and in some cases acetyl chlorid). When the acetone-soluble condition is produced, the acetic values are practically all in the form of acetic acid. These acetic values are relatively expensive and consequently the amount of them which is used up in the process has an important bearing upon the cost of the cellulose acetate which is produced. Their recovery substantially in condition for further acetylation, when effected inexpensively, lowers the total cost of the manufacturing operations and thereby cheapens the cost of the product.

It has been previously proposed to wash the reaction mixture with a considerable excess of water to free it from the acetic values and precipitate the cellulose acetate. Since the values are thus brought into dilute solutions, they can be recovered only at an undesirable expense. The evaporation and chemical reactions have proven to be either too complicated or too costly.

I have found that the recovery of the acetic values can be carried out at greatly reduced expense and trouble by spraying the reaction mixture into a desiccating gaseous vehicle, such as air, which takes up vapors of said values from the spray and thereby converts the latter into a powder which is relatively dry. The taking up of the vapors and the conversion into powder take place very rapidly, because of the extremely large aggregate surface of the sprayed particles relative to their total mass.

I have furthermore discovered that the recovery of the acetic values takes place more thoroughly and more inexpensively if the gaseous vehicle be passed not only through the zones where the spraying and drying to powder take place, but also to zones where the vapor is removed. In the preferred form of my invention the gas is circulated repeatedly in sequence through the spraying and drying, condensing and reheating zones. By using the same gaseous vehicle over and over again high concentrations of vapors of acetic values are insured, with consequent ease in condensing or absorbing them. Since complete removal of the vapors of acetic values from the gas is not advisable (because solid acid forms and clogs the condenser at too low temperature) the gas would carry away waste and unextracted vapors, if discharged into the atmosphere. Recirculation prevents such loss. The powder formed in the process is in a very convenient form for storage and for further treatment. By reason of its very great surface every particle of it is rapidly acted upon in any fluid treatment, so that the effects are substantially uniform,—an important feature when operating on a manufacturing scale. If reaction liquids act more rapidly on some parts of the material to be treated than they do on others, a heterogeneous mixture of irregularly reacted material is apt to occur.

Of course, many forms of apparatus may be employed for carrying out my process, the one shown in the drawing being merely illustrative of one typical species.

Into a drying and powder-collecting chamber 1 the reaction mixture is sprayed from spraying chamber 2, the desiccating gaseous vehicle, such as heated air, being forced into contact with the spray so as to quickly take up vapors of acetic values from the fine atomized particles to such an extent that the latter form a relatively dry powder which collects in the bottom of the chamber 1 and may be removed through the door 3. The vehicle carrying the vapors then passes through pipe 4 into any suitable condenser 5, the condensed values being collected in section 6 thereof. The gaseous vehicle, deprived of a large part of its entrapped vapors, then passes through pipe 7 to blower or compressor 8, and thence through pipe 9 to the reheating station 10. From the latter it again passes into the nozzles or other directing devices of chamber 2.

The units of this apparatus are well known to those skilled in the art and consequently the details of them need not be described. The spraying and drying chambers and their accessories may be substantially of the type indicated in U. S. Letters Patent No. 1,183,098, Merrell, et al., May 16, 1916, desiccating apparatus, No. 1,141,879, Merrell, et al., June 1, 1915, desiccating process, and No. 1,183,393, Merrell, et al., May 16, 1916, spraying nozzle, these applying the general principles of No. 666,711, Stauf, Jan. 29, 1901, method of desiccating blood. Of course, the parts of the apparatus are made of materials especially resistant to the corrosive action of acetic acid and acetic anhydride and the other active compounds of the reaction mass. The application of aluminum, copper, bronzes, corrosion-resisting ferrous materials, such as iron-chromium alloys and the like, can be readily made where needed, as will be understood by anyone skilled in the art.

In carrying out my process in this apparatus, by way of illustration, the reaction mixture, such as one of those shown at the different stages of the Miles patent cited above, (or one having a solid condensing agent which facilitates the powdering) is charged into chamber 2 in the usual way. Here it is blown through a nozzle into a fine spray or mist and is brought into intimate contact with a current of warm, dry air which acts as the desiccating vehicle. The acetic values vaporize extremely rapidly from the particles of the mist, leaving the latter as a powder, sufficiently dry to prevent the particles from undesirable sticking or cohering together. The chamber 1 being relatively large, the particles of the powder have time to settle to the bottom.

The vapor-laden vehicle then passes out of the chamber, preferably through a filter box 11 of known conventional type. With the powder particles very largely removed from it, the vapor-laden air passes out to a value-removing zone. This may take the form of one of the well known absorbing towers in which the acetic acid and acetic anhydride are absorbed in suitable liquids; but I prefer to use a condensing apparatus 5 in which the vapor-laden air is rapidly chilled to a temperature at which a large part of the vapors are condensed. I have found 60° F. to be useful, because it avoids clogging by the formation of solidified values, but it is susceptible of considerable variation. The liquid acetic acid and other values are then collected and withdrawn.

The gaseous vehicle then contains no more acetic values than those corresponding to the vapor pressures of such values at the condensing temperature. The vehicle passes through the compressor or blower 8, which forces it through pipe 9 and reheater 10. The latter is adapted to bring the temperature of the gas to such a point that when the warmed gas is blown from chamber 2 into chamber 1 it will be at the correct temperature for desiccation of the spray without impairing the latter. A good working temperature is 150° F. Of course, this can be varied considerably according to the particular constitution of the reaction mixture; but it preferably should not range much above 180° F., because impairment of the product may take place. With the customary reaction mixtures I prefer to keep within 15° either way from 150° F.

The gaseous vehicle, such as heated air, which is used in the spraying and drying operations, contains some residual amounts of acetic acid vapor. But these are sufficiently below the saturation point, at the temperature produced by the reheating, to avoid interference with the quick and thorough drying of the spray.

While the vapors of acetic values may be absorbed by bubbling the vapor-laden vehicle through a suitable liquid and then separating the values from such liquid, nevertheless, I find it preferable to use the condensing method, an example of which is given above, because it avoids further unnecessary distilling operations, and because it obtains the acetic values in a form pure enough for reuse in further acetylation. The freedom of the recovered acetic values from impurities such as volatile mineral acids, may be insured by using the expedients set forth in my application, Serial No. 662,910, filed Sept. 15, 1923, for process of manufacturing cellulose acetate.

The finished powder, because of its exceptionally large aggregate surface relative to its mass, can be very rapidly treated by liquids in further steps of manufacture, such as by wash water or baths or hydrolyzing mixtures, or by solvents, etc. The powder will remain as such even when considerable amounts of acetic acid are left in it, for instance when there is slightly more than 1 part of acetic acid by weight for 1 part of cellulose acetate. I prefer, however, to conduct the process as described above, so that the amount of acetic acid left in the powder is only about one-quarter or less of the weight of cellulose acetate. This small residuum of acetic acid does no harm in the further operations of the process, especially when the spraying and powdering is done at the end of the chloroform-soluble stage, because the small amount of acetic acid cooperates with the main hydrolyzing acid in converting the material to the acetone-soluble form. I consider the powder to be relatively dry when the particles of it do not stick together sufficiently to spoil the advantages of the powder form recited above.

Having thus described my invention, what I claim as new and desire to secure by Letters Patent is:

1. In the process of manufacturing cellulose acetate, spraying a flowable cellulose acetate reaction mass containing volatile acetic values into a desiccating gaseous vehicle which takes up vapors of said values, and converts the spray into a relatively dry powder.

2. In the process of manufacturing cellulose acetate, spraying a flowable cellulose acetate reaction mass containing volatile acetic values into a desiccating gaseous vehicle which takes up vapors of said values and converts the spray into a relatively dry powder, separating said vapor-laden gaseous vehicle from said powder, and recovering said acetic values from said vehicle.

3. In the process of manufacturing cellulose acetate, spraying a flowable cellulose acetate reaction mixture containing volatile acetic values into a desiccating gaseous vehicle which takes up vapors of said values and converts the spray into a relatively dry powder, separating said vapor-laden vehicle from said powder and cooling said vehicle sufficiently to condense the acetic values therefrom.

4. In the process of manufacturing cellulose acetate, repeatedly passing a gaseous vehicle through spraying and drying and value-recovering zones, a flowable cellulose acetate reaction mass containing volatile acetic values being sprayed into said vehicle at the first named zone, vapors of said values being taken up by the vehicle and the spray being thereby converted into relatively dry powder which is separated, at least part of said vapors being removed at said recovery zone.

5. In the process of manufacturing cellulose acetate, repeatedly passing a gaseous vehicle through spraying and drying, condensing, and reheating zones, a flowable cellulose acetate reaction mass containing volatile acetic values being sprayed into said vehicle at the first named zone, vapors of said values being taken up by the vehicle and the spray being thereby converted into a relatively dry powder which is separated, at least part of said vapors being removed at said condensing zone.

6. In the process of manufacturing cellulose acetate, converting into a fine spray in a current of heated desiccating air a flowable cellulose acetate reaction mass containing acetic acid, said air taking up vapors of said acid and converting said spray into relatively dry powder, collecting said powder, and separating the vapor-laden air from the powder.

7. In the process of manufacturing cellulose acetate, converting into a fine spray in a current of heated desiccating air a flowable cellulose acetate reaction mass containing acetic acid, said air taking up vapors of said acid and converting said spray into a relatively dry powder, collecting said powder, separating the vapor-laden air from the powder, and recovering said acetic acid therefrom.

8. In the process of manufacturing cellulose acetate, converting into a fine spray in a current of heated desiccating air a flowable cellulose acetate reaction mass containing acetic acid, said air taking up vapors of said acid and converting said spray into a relatively dry powder, collecting said powder, separating the vapor-laden air from the powder, and cooling it to condense acetic acid therefrom.

9. In the process of manufacturing cellulose acetate, repeatedly passing a current of desiccating air through spraying and drying and value-recovering zones, a flowable cellulose acetate reaction mass containing acetic acid being sprayed into said air at the first named zone, vapor of acetic acid being taken up by the air and the spray being thereby converted into a relatively dry powder which is separated out from the air before the latter reaches said value-recovering zone, at least part of the acetic acid being removed from the air at said recovering zone.

10. In the process of manufacturing cellulose acetate, repeatedly passing a current of desiccating air through spraying and drying, condensing and reheating zones, a flowable cellulose acetate reaction mass containing acetic acid being sprayed into said air at the first named zone, vapor of said acid being taken up by the air and the spray being thereby converted into a relatively dry powder which is separated from said air before the latter reaches said condensing zone, at least part of the acetic acid vapors being condensed by cooling at said condensing zone, and the air being reheated at said reheating zone.

Signed at Rochester, New York, this 6th day of November, 1923.

WILLIAM R. WEBB.